United States Patent [19]

Lievesley

[11] Patent Number: 4,815,194

[45] Date of Patent: Mar. 28, 1989

[54] METHOD OF MAKING VEHICLE SUNROOFS

[75] Inventor: John B. Lievesley, Mamble, England

[73] Assignee: Barker, Brettell & Duncan, England

[21] Appl. No.: 176,860

[22] Filed: Apr. 4, 1988

[30] Foreign Application Priority Data

Apr. 7, 1987 [GB] United Kingdom ............... 8708299

[51] Int. Cl.⁴ ............................................. B21D 39/00
[52] U.S. Cl. ...................................... 29/514; 29/521; 296/216; 296/218
[58] Field of Search ................. 29/514, 521, 515, 445, 29/DIG. 47, 505, 400 D, 408, 409, 410; 52/204, 720, 205, 206; 296/216, 217, 218, 214

[56] References Cited

U.S. PATENT DOCUMENTS

| | | | |
|---|---|---|---|
| 3,579,804 | 5/1971 | Slan | 29/445 |
| 3,737,980 | 6/1973 | Kotkins | 29/445 |
| 4,585,269 | 4/1986 | Lievesley | 296/214 |
| 4,666,206 | 5/1987 | Hough | 296/216 |

Primary Examiner—P. W. Echols
Assistant Examiner—Kevin E. Jordan

[57] ABSTRACT

A method of manufacturing a rectangular frame for a vehicle sunroof in which first and second straight metal profiles (38, 40) are assembled to form a frame stock assembly which is bent at intervals along its length to form the frame. The profiles are arranged as radially outer and inner components, respectively, in the plane of the bend and are coupled by means of a web (42) of the inner component (40) engaging in a slot (44) in the outer component (38). The profiles are assembled together by sliding the web longitudinally along the slot, and interengaging surfaces (43, 45) remain free to slide against one another during bending of the assembly. The profiles are assembled prior to shaping the frame. During bending the profiles can slide relative to one another reducing deformation occurring at the bend and allowing the frames to be formed with tighter bends at the corners than has previously been possible.

5 Claims, 2 Drawing Sheets

METHOD OF MAKING VEHICLE SUNROOFS

In a well-known kind of vehicle sunroof installation, for example as described in British Patent Application No. 2 136 038A, a generally rectangular metal frame is fitted into a correspondingly shaped opening in the vehicle roof, the frame being secured to the roof edge all around the opening. The frame serves as a rigid support for a movable panel and various associated fittings, enabling the panel to be moved pivotally on the frame in opening and closing the sunroof.

Such a rectangular metal frame can be formed economically by bending a suitable length of straight profile stock, four ninety-degree bends at appropriate length intervals producing the required form. The opposed ends of the length are suitably secured in a butt joint.

The cross-sectional form of the profile is determined by certain features which are necessary for the role of the frame. For example, the frame would ordinarily have oppositely-projecting upper and lower flanges, the former to enable it to be supported by the vehicle roof, the overlying flange being riveted or otherwise secured to the roof, and the latter to support a sealing gasket against which a margin of the movable panel is pressed down when the sunroof is closed. Conveniently such profile may be manufactured in aluminium as an extruded section.

The required cross-section of the profile stock, coupled with the necessary physical properties of the frame material, puts a constraint on the minimum radius of curvature (i.e. the tightness of the bend) which can be achieved at each of the four bends in forming a frame; should the stock be bent too far, overstressing the material on one or both of the inside and the outside of the bend, unacceptable deformation (e.g. buckling or cracking) occurs on the bend.

In order to form frames with tighter corners, other manufacturing methods (particularly the moulding of plastics frames) have been turned to but at the expense, for example, of rigidity in the frame.

It is an object of the present invention to provide an improved method of manufacturing a vehicle sunroof frame which has tighter bends than in bent metal frames hitherto.

The invention provides, in one of its aspects, a method of manufacturing a frame for a vehicle sunroof in which parallel first and second metal profiles form a frame stock assembly which is bent in formation of the frame, the two profiles being arranged as radially outer and inner components respectively of the assembly in the plane of the bend and relative sliding movements between interengaging faces of the profiles being permitted during bending.

Each of the two profiles behaves substantially independently of the other during bending. Since neither has the depth (measured in the plane of the bend) of the frame as a whole, tighter bends can be achieved than if the frame were of one piece.

The two metal profiles may each be an aluminium extruded section.

In a preferred construction the second profile (i.e. the radially inner component of the assembly) comprises a coupling web which lies generally in a plane which extends transversely of the plane of the bend and is slidingly accommodated in a corresponding slot in the first profile, the two profiles being assembled by sliding the web of the second longitudinally into the slot of the first before bending of the assembly in manufacture of the frame.

There now follows a detailed description, to be read with reference to the accompanying drawings, of a vehicle sunroof frame and its manufacture which illustrates the invention by way of example.

Figure 1:
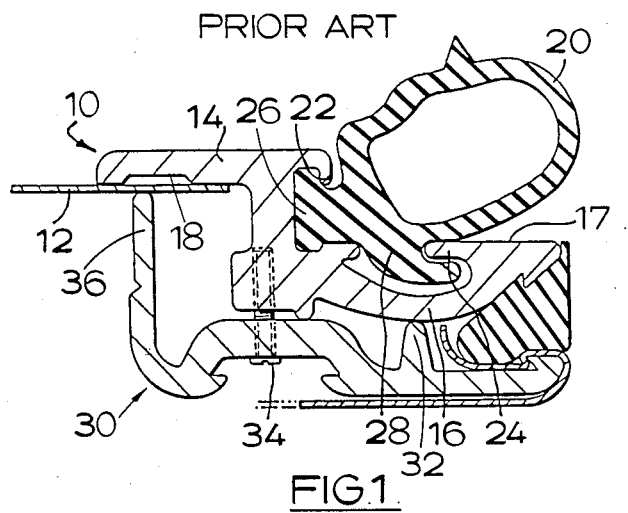
FIG. 1 illustrates from the prior art the use of upper and lower metal frames in a vehicle sunroof construction, the view being in cross-section through the frames.
Figure 2:
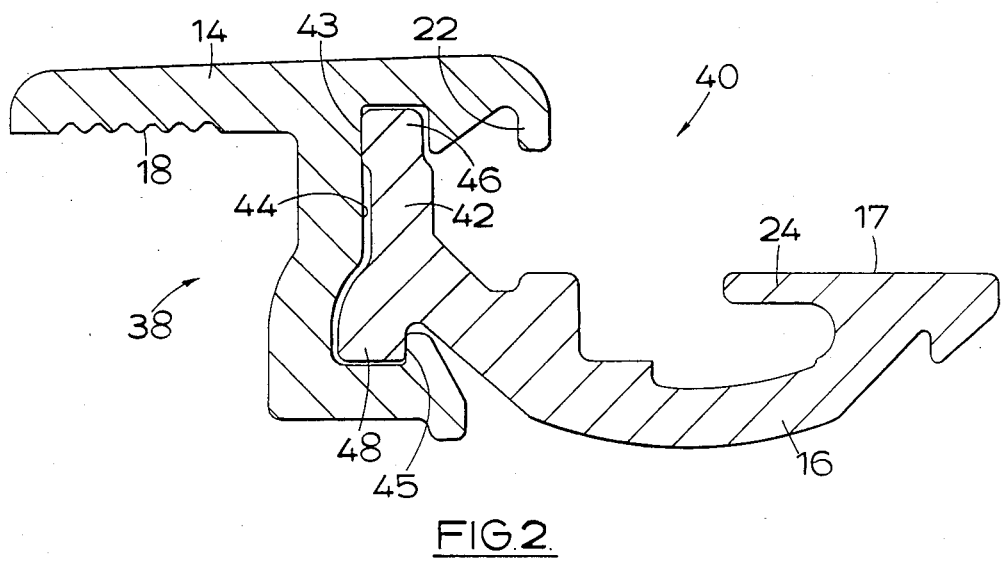
FIG. 2 shows, in cross-section assembled aluminium profiles for performance of the invention in forming an upper frame.

With reference to FIG. 1, in a known sunroof construction (described in more detail in Patent Application No. 2 136 038A) a metal upper frame member 10 is adapted to be fitted into a correspondingly shaped opening in a vehicle roof 12. The member 10 comprises oppositely projecting upper and lower flanges 14 and 16, respectively, the former enabling it to be supported by (and secured to) the vehicle roof 12; a sealing strip (not shown) would be trapped between the roof and a seal-retaining feature 18 on the underside of the upper flange 14. The lower flange 16 serves by means of a flat upper face 17 to support a gasket 20 against which a margin of a movable glass panel (not shown in FIG. 2) would be pressed down from above when the sunroof is closed. The frame member 10 comprises suitable gasket-retaining formations 22 and 24 to co-operate with formations 26 and 28 on the gasket 20 to keep the gasket in place.

The sunroof construction comprises also a metal lower frame member 30 (arranged beneath the upper frame member 10 and in parallel with it) which comprises an upwardly protruding rib 32 arranged to bear against the underside of the lower flange 16 of the upper member. The lower member can rock about the rib, and fixing screws 34 interconnecting the two members cause an upwardly extending web 36 of the lower member to become pressed against the underside of the roof 12 as they are inserted.

The upper and lower frame members 10 and 30 are both of a generally rectangular shape, as viewed in plan. Each member is formed by bending straight profile stock, four ninety-degree bends at appropriate length intervals producing the required form; the opposed ends of the length are suitably secured in a butt joint.

In accordance with the invention, an upper frame member is manufactured utilising first and second profiles 38 and 40, respectively, assembled together (FIG. 2) for use in a generally similar manner to the frame member 10 hereinbefore described. Where appropriate, the same reference numerals are applied to the new frame member shown in FIG. 2, to indicate constructional features corresponding to those of the prior art member described, and those features will not be described further.

Each of the two profiles 38 and 40 is procured as a straight extruded aluminium section. The two profiles are coupled together in parallel, to form a frame stock assembly, by sliding a coupling web 42 of the second profile 40 along a corresponding slot 44 in the first profile 38. A suitable lubricant is best applied to the web and/or the slot prior to assembly. Upper and lower portions 46 and 48, respectively, of the web so become locked into upper and lower receiving portions of the slot 44, discrete upper and lower faces 43 and 45 of the web opposing surfaces of the first profile in the slot (see FIG. 2).

Bending of the assembly is then effected in formation of a frame, the first and second profiles 38 and 40 being arranged as radially outer and inner components, respectively, of the assembly in the plane of each bend. Relative sliding movements can occur during bending between interengaging faces of the first profile 38 and the web 42, the web lying generally in a plane extending transversely of the plane of bending.

Figure 3:
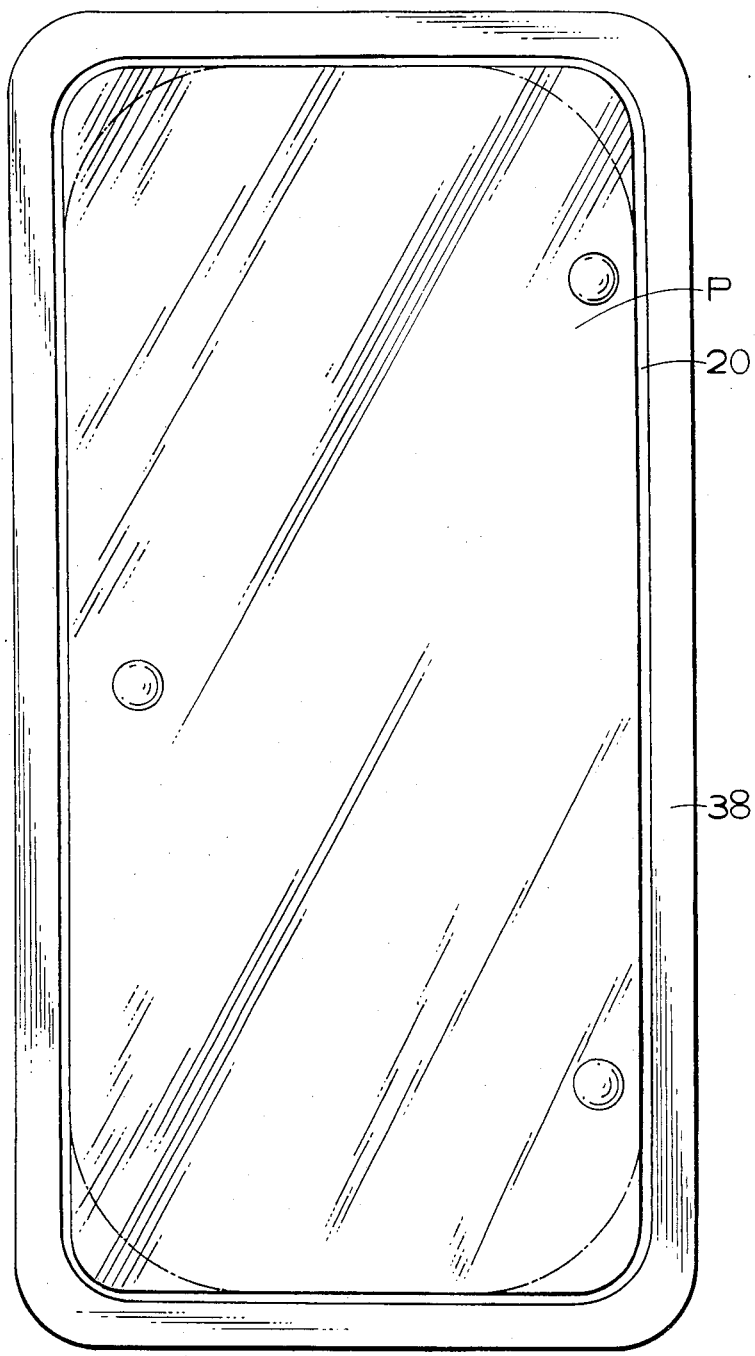
FIG. 3 is a plan view of a sunroof showing the generally rectangular shape of the frame.

Because the overall depth of the frame stock assembly, measured along a bend radius, is made up by the two relatively slidable components, the assembly can be bent without unacceptable distortion to a smaller radius of curvature than a one-piece frame member of corresponding depth could be. This is illustrated by FIG. 3, in which the achievable bend for an equivalent one-piece frame member is indicated in broken line. In that figure, reference P indicates the movable glass panel of the sunroof.

I claim:

1. A method of manufacturing a generally rectangular panel-supporting frame for a vehicle sunroof comprising procuring first and second metal profiles, assembling together the two profiles side-by-side to form a frame stock assembly in which relative sliding movements can occur between interengaging faces of the profiles, and forming the rectangular frame by bending the assembly at spaced intervals along its length with the first and second profiles arranged as radially outer and inner components, respectively, in the plane of the bend.

2. A method according to claim 1 wherein one of the profiles comprises a coupling web which lies generally in a plane which extends transversely of the plane of the bend and in the assembly is slidingly accommodated in a corresponding slot in the other profile.

3. A method according to claim 2 wherein the two profiles are assembled by sliding the web of the one profile longitudinally into the slot of the other profile before bending of the assembly.

4. A method according to claim 2 wherein the web is on said second profile and the slot is in said first profile.

5. A method according to claim 1 wherein each of the profiles is an extruded metal section.

* * * * *

UNITED STATES PATENT AND TRADEMARK OFFICE
CERTIFICATE OF CORRECTION

PATENT NO. : 4,815,194

DATED : March 28, 1989

INVENTOR(S) : John B. Lievesley

It is certified that error appears in the above-identified patent and that said Letters Patent is hereby corrected as shown below:

Title page:

Assignee should be Autoroofs Limited, Halesowen, England

Signed and Sealed this

Fourteenth Day of November, 1989

*Attest:*

JEFFREY M. SAMUELS

*Attesting Officer*         *Acting Commissioner of Patents and Trademarks*